United States Patent
Pratt et al.

(10) Patent No.: US 8,959,561 B2
(45) Date of Patent: Feb. 17, 2015

(54) SYSTEM AND METHOD FOR TAGGING VIDEO CONTENT

(71) Applicant: AT&T Intellectual Property I, LP, Atlanta, GA (US)

(72) Inventors: James Pratt, Round Rock, TX (US); Steven M. Belz, Cedar Park, TX (US); Marc Sullivan, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/918,165

(22) Filed: Jun. 14, 2013

(65) Prior Publication Data

US 2013/0283309 A1 Oct. 24, 2013

Related U.S. Application Data

(63) Continuation of application No. 12/267,805, filed on Nov. 10, 2008, now Pat. No. 8,490,142.

(51) Int. Cl.
*H04N 7/173* (2011.01)
*H04N 21/472* (2011.01)
*H04N 21/258* (2011.01)
*H04N 21/61* (2011.01)
*H04N 21/8358* (2011.01)
*H04N 21/84* (2011.01)

(52) U.S. Cl.
CPC ......... *H04N 21/472* (2013.01); *H04N 7/17318* (2013.01); *H04N 21/25816* (2013.01); *H04N 21/25833* (2013.01); *H04N 21/47211* (2013.01); *H04N 21/6125* (2013.01); *H04N 21/6175* (2013.01); *H04N 21/8358* (2013.01); *H04N 21/84* (2013.01)
USPC ............................ 725/109; 725/106; 725/110

(58) Field of Classification Search
CPC ...................................................... H04N 7/173
USPC .......................................... 725/106, 109, 110
See application file for complete search history.

(56) References Cited

U.S. PATENT DOCUMENTS

| | | | |
|---|---|---|---|
| 8,490,142 B2 * | 7/2013 | Pratt et al. ..................... 725/109 |
| 2004/0268403 A1 | 12/2004 | Krieger |
| 2006/0123053 A1 | 6/2006 | Scannell |
| 2008/0022297 A1 | 1/2008 | Walter |
| 2008/0086458 A1 | 4/2008 | Robinson |
| 2008/0104246 A1 | 5/2008 | Katz |
| 2008/0104521 A1 | 5/2008 | Dubinko |
| 2008/0134054 A1 | 6/2008 | Clark |
| 2008/0168449 A1 | 7/2008 | Rice |
| 2008/0235733 A1 | 9/2008 | Heie |
| 2008/0263610 A1 | 10/2008 | Murray |
| 2008/0271098 A1 | 10/2008 | Kalaboukis |
| 2009/0150947 A1 | 6/2009 | Soderstrom |

* cited by examiner

*Primary Examiner* — Kieu Oanh T Bui
(74) *Attorney, Agent, or Firm* — Guntin & Gust, PLC; Ralph Trementozzi (57) ABSTRACT

A method of tagging video content includes receiving video content at a set-top box device via a private video distribution access network. The method also includes receiving a tag associated with the video content at the set-top box device and sending the tag to a tag management system via the private video distribution access network. Further, the method includes sending a request for content associated with the tag to the tag management system and receiving the video content at the set-top box device.

20 Claims, 7 Drawing Sheets

SYSTEM AND METHOD FOR TAGGING VIDEO CONTENT

CROSS-REFERENCE TO RELATED APPLICATIONS

This application is a continuation of U.S. patent application Ser. No. 12/267,805 filed Nov. 10, 2008 which is incorporated herein by reference in its entirety.

FIELD OF THE DISCLOSURE

The present disclosure generally relates to communications networks, and more particularly relates to tagging video content.

BACKGROUND OF THE DISCLOSURE

Television viewing is a part of life for many people. Viewers may wish to choose or recall certain programs. Electronic program guides provide one manner of selecting programs, but this approach can be cumbersome for the viewers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

In a particular embodiment, a method of tagging video content includes receiving video content at a set-top box device via a private video distribution access network. The method also includes receiving a tag associated with the video content at the set-top box device and sending the tag to a tag management system via the private video distribution access network. Further, the method includes sending a request for content associated with the tag to the tag management system and receiving the video content at the set-top box device.

In another particular embodiment, a method of tagging video content includes receiving a tag at a tag management system from a user device associated with a set-top box device and storing the tag at the tag management system in association with particular video content received at the set-top box device. The method also includes receiving a request from the set-top box device for content associated with the tag and instructing a video source to send the particular video content to the set-top box device.

In a further embodiment, a set-top box device comprises a processor and memory accessible to the processor. The memory includes instructions executable by the processor to receive video content via a private video distribution access network; receive a tag associated with the video content; send the tag to a tag management system via the private video distribution access network; send a request for content associated with the tag to the tag management system; and receive the video content at the set-top box device.

In yet another embodiment, a system to tag video content includes a tag management system including a processor and memory accessible to the processor. The memory includes instructions executable by the processor to store a received tag in association with particular video content received at a set-top box device and instruct a video source to send the particular video content to the set-top box device after receiving a request from the set-top box device for content associated with the tag.

In an additional embodiment, a computer-readable medium includes processor-readable instructions that are executable by a processor to perform a method, where the method comprises sending a request for content associated with a tag to a tag management system via a private video distribution access network and receiving video content associated with the tag at the set-top box device.

Figure 1:
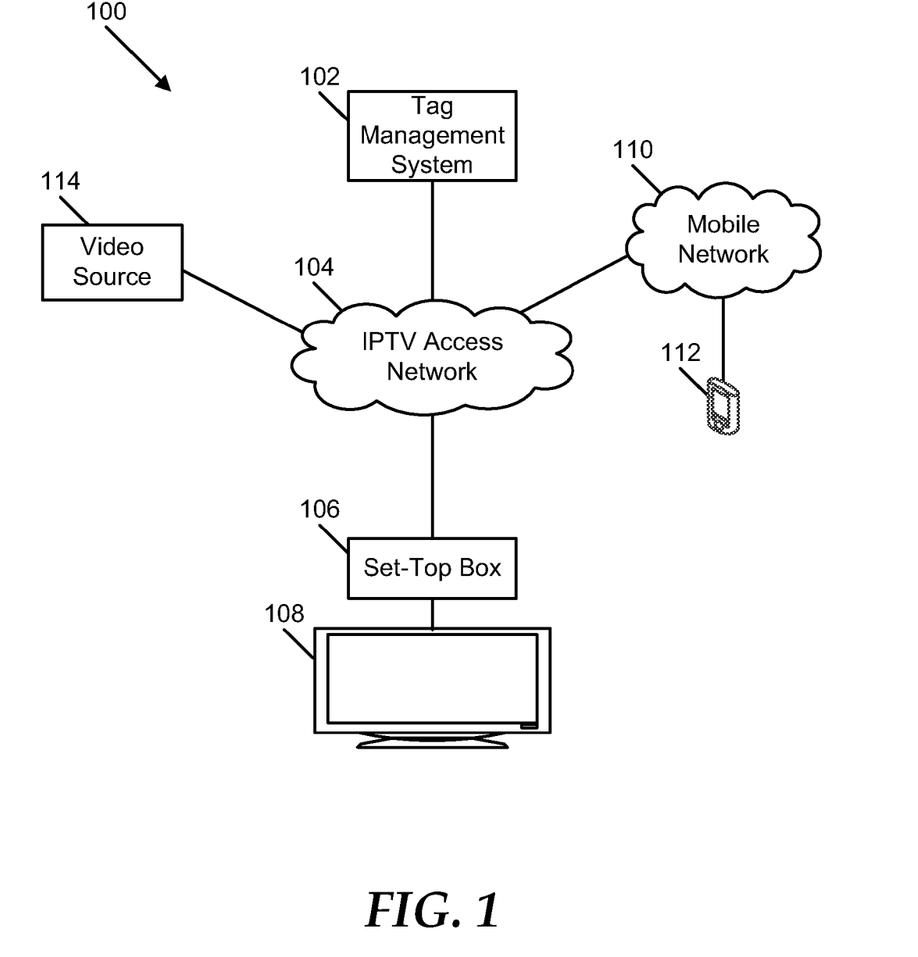
FIG. 1 is a block diagram illustrating a particular embodiment of a system to tag video content.

FIG. 1 illustrates a particular embodiment of a system 100 to tag video content. The system 100 includes a tag management system 102 that communicates with a set-top box device 106 via a private video distribution access network, such as an Internet Protocol Television (IPTV) access network 104. The set-top box device 106 is coupled to a display device, such as a television 108. In an illustrative embodiment, the set-top box device 106, the tag management system 102, or a combination thereof, can also communicate with a user device associated with the set-top box device 106. The user device can include, for example, a wireless phone, a digital music player, a handheld computing device, or any combination thereof. For instance, the tag management system 102, the set-top box device 106, or a combination thereof, can communicate with a user phone 112 directly via a mobile network 110, via the IPTV access network 104, via another network, or any combination thereof. The system 100 also includes a video source 114, such as a video server, a distribution server, or other video source, that communicates with the tag management system 102, the set-top box device 106, or a combination thereof, via the IPTV access network 104, another network, or a combination thereof.

In an illustrative embodiment, the set-top box device 106 is adapted to receive video content from the video source 114 and to send the video content to the television 108. The set-top box device 106 can also be adapted to decode the video content, buffer the video content, otherwise process the video content, or any combination thereof, prior to sending the video content to the television 108.

Further, the set-top box device 106 is adapted to receive a tag that is to be associated with the video content. In one embodiment, the tag includes a non-hierarchical categorization of the video content. For example, an episode of MASH can be tagged with words or phrases, such as comedy, Korean War, Alan Alda, medical, other words or phrases, or any combination thereof. In another embodiment, a tag can include text, pictures, graphics, or any combination thereof.

In one embodiment, the set-top box device 106 can be adapted to receive the tag from a user interacting with the set-top box device 106, such as via a remote control device (not shown). In another embodiment, the user can input the tag at the user phone 112, and the user phone can be adapted to send the tag to the set-top box device 106 via the IPTV access network 104. In yet another example, the user phone 112 can be adapted to send the tag to the tag management system 102 via the mobile network 110, the IPTV access network 104, another network, or any combination thereof, and the tag management system 102 can be adapted to send the tag to the set-top box device 106 before or after storing the tag at the tag management system 102.

The set-top box device 106 is adapted to send the received tag to the tag management system 102. In one example, the set-top box device 106 can periodically upload any tags received since a previous periodic upload. In another example, the set-top box device 106 can upload each tag after it is received. In a particular embodiment, the set-top box device 106 can register the tag with the set-top box device 106, such as by storing data identifying the tag at the set-top box device 106, before sending the tag to the tag management system 102.

The tag management system 102 is adapted to receive the tag from the set-top box device 106. The tag management system 102 can also receive an indication from the set-top box device 106 of video content with which the tag is to be associated. Further, the tag management system 102 can receive data from the set-top box device 106 indicating whether the tag is to be stored as a public tag; is to be stored in association with a set-top box of another user; is to be stored in association with a social network with which the user is associated; as otherwise specified; or any combination thereof. The tag management system 102 is adapted to store the tag in association with the set-top box device 106 and the video content, as otherwise specified by data received from the set-top box device 106, or a combination thereof.

In another embodiment, the tag management system 102 can be adapted to receive the tag from the user phone 112 and to identify the user phone 112, such as via caller identification information, an Internet protocol address, other information, or a combination thereof. Further, the tag management system 102 is adapted to identify the set-top box device 106 and to identify video content received at the set-top box device 106 at or before a time that the tag was received at the tag management system 102. The tag management system 102 can be adapted to store the tag in association with data related to the set-top box device 106 and to the identified video content.

In addition, the set-top box device 106 is adapted to receive a request for tagged video content. In one embodiment, the set-top box device 106 can provide a graphical user interface (GUI) at the television 108 in response to the request, where the GUI includes a list of selectable tags registered at the set-top box device 106. The set-top box device 106 can be adapted to receive a selection of the particular tag via the GUI. In another embodiment, the set-top box device 106 can be adapted to request tagged content from the tag management system 102. The set-top box device 106 can be adapted to receive data related to options of tags accessible to the set-top box device 106 from the tag management system 102 and to provide a GUI at the television 108, which includes a list of the accessible tags. The set-top box device 106 can be adapted to receive a selection of the particular tag via the GUI.

The particular tag can be a tag submitted by a user associated with the set-top box device 106, or a tag made accessible to the set-top box device 106 by another user, including a tag created by a user associated with another set-top box device at a different location, such as public tags, tags accessible to a social network that includes the user, other tags, or any combination thereof. In a particular embodiment, the set-top box device 106 can be adapted to send data indicating the particular tag to the tag management system 102.

The set-top box device 106 is adapted to send a request for content associated with the particular tag to the tag management system 102. In one example, the request can include data indicating the selection of the particular tag via a GUI. The tag management system 102 is adapted to receive the request and to send data related to a plurality of options of video content associated with the particular tag to the set-top box device 106. The set-top box device 106 can be adapted to receive the options of video content associated with the particular tag and to provide a GUI that includes the video content options at the television 108. The set-top box device 106 is adapted to receive a selection of video content via the GUI and to send a request for the selected video content to the tag management system 102. In one embodiment, the tag management system 102 can be adapted to receive the request for the selected video content from the set-top box device 106 and to instruct the video source 114 to send the selected video content to the set-top box device 106. In another embodiment, the set-top box device 106 can send the request for the selected video content to the video source 114.

In one embodiment, the set-top box device 106 can determine whether it is authorized to receive the requested video content. For example, if the video content is pay-per-view video content or requires digital rights management (DRM) authorization, the set-top box device 106 can be adapted to procure authorization, such as by prompting the user to purchase the video content. The set-top box device 106 is adapted to receive the requested video content and to send the video content to the television 108.

Figure 2:
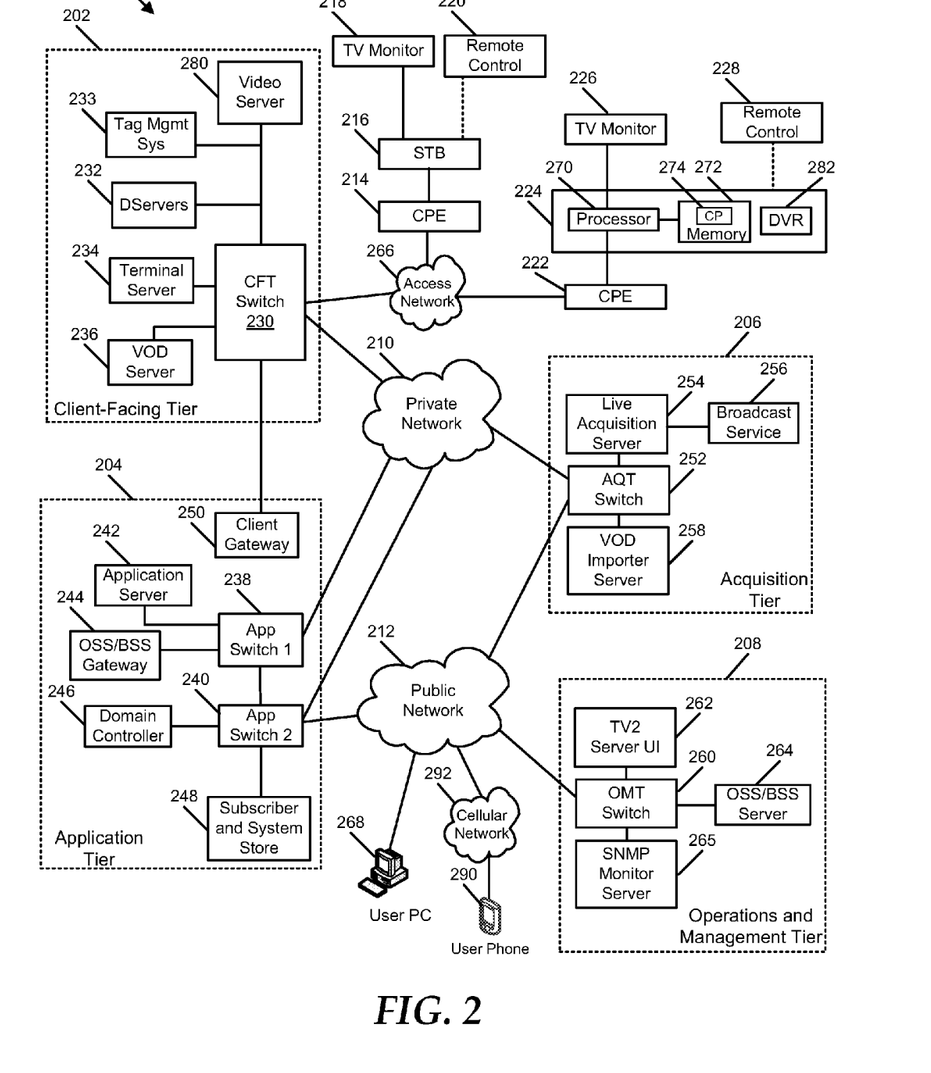
FIG. 2 is a block diagram illustrating another embodiment of a system to tag video content.

FIG. 2 illustrates another embodiment of a system 200 to tag video content. The system 200 includes elements of an IPTV system having a client facing tier 202, an application tier 204, an acquisition tier 206, and an operations and management tier 208. Each tier 202, 204, 206, and 208 is coupled to a private network 210, a public network 212, or both the private network 210 and the public network 212. For example, the client-facing tier 202 can be coupled to the private network 210, while the application tier 204 can be coupled to the private network 210 and to a public network, such as the Internet. The acquisition tier 206 can also be coupled to the private network 210 and to the public network 212. Moreover, the operations and management tier 208 can be coupled to the public network 212.

The various tiers 202, 204, 206 and 208 communicate with each other via the private network 210 and the public network 212. For instance, the client-facing tier 202 can communicate with the application tier 204 and the acquisition tier 206 via the private network 210. The application tier 204 can also communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204 can communicate directly with the client-facing tier 202.

The client-facing tier 202 can communicate with user equipment via a private access network 266, such as an Internet Protocol Television (IPTV) access network. In an illustrative embodiment, customer premises equipment (CPE) such as a first CPE device 214 and a second CPE device 222 can be coupled to the private access network 266. The CPE devices 214 and 222 can include modems (e.g., digital subscriber line modems), residential gateways, routers, other devices, or any combination thereof. The client-facing tier 202 can communicate with a first representative set-top box (STB) device 216 via the first CPE device 214 and with a second representative set-top box device 224 via the second CPE device 222. The client-facing tier 202 can communicate with a large number of set-top boxes over a wide geographic area, such as a regional area, a metropolitan area, a viewing area, or any other suitable geographic area that can be supported by networking the client-facing tier 202 to numerous set-top box devices. In one embodiment, the client-facing tier 202 can be coupled to the CPE devices 214 and 222 via fiber optic cables. Alternatively, the CPE devices 214 and 222 can be digital subscriber line (DSL) modems that are coupled to one or more network nodes via twisted pairs, and the client-facing tier 202 can be coupled to the network nodes via fiber-optic cables. Each of the set-top box devices 216 and 224 can process data received from the private access network 266 via an IPTV software platform such as Microsoft® TV IPTV Edition.

The first set-top box device 216 can be coupled to a first display device 218, such as a first television monitor, and the second set-top box device 224 can be coupled to a second display device 226, such as a second television monitor. Moreover, the first set-top box device 216 can communicate with a first remote control 220, and the second set-top box device 224 can communicate with a second remote control 228. In an exemplary, non-limiting embodiment, each of the set-top box devices 216 and 224 can receive data or video from the client-facing tier 202 via the private access network 266 and render or display the data or video at the display device 218 or 226 to which it is coupled. The set-top box devices 216 and 224 may include tuners that receive and decode television programming information for transmission to the display devices 218 and 226. Further, each of the set-top box devices 216 and 224 can include processing logic and memory accessible to the processing logic, such as the STB processor 270 and the STB memory device 272. Each STB memory device may include one or more computer programs, such as the computer program 274, which are executable by the STB processing logic. In one embodiment, one or more of the set-top box devices 216 and 224 may include integrated digital video recorder (DVR) devices or components, such as the DVR 282. In other embodiments, one or more of the set-top box devices 216 and 224 can be coupled to external DVR devices.

In an illustrative embodiment, the client-facing tier 202 can include a client-facing tier (CFT) switch 230 that manages communication between the client-facing tier 202 and the private access network 266, and between the client-facing tier 202 and the private network 210. As shown, the CFT switch 230 is coupled to one or more distribution servers (D-servers) 232 that may receive and store video content, requests, other data, or any combination thereof, which is bound to and from the set-top box devices 216 and 224. Further, the CFT switch 230 can be coupled to a tag management system 233 that receives and stores tags associated with video content and that processes requests related to such tags and video content. The CFT switch 230 can also be coupled to a terminal server 234 that provides terminal devices with a common connection point to the private network 210. In a particular embodiment, the CFT switch 230 can also be coupled to a video-on-demand (VOD) server 236. The CFT switch 230 is also coupled to a video server 280 that stores video content that is to be distributed via the access network 266 to the set-top box devices 216 and 224. In an illustrative, non-limiting embodiment, the client-facing tier can include a plurality of video servers 280, where each video server 280 is associated with one or more channels.

The application tier 204 communicates with both the private network 210 and the public network 212. In this embodiment, the application tier 204 can include a first application tier (APP) switch 238 and a second APP switch 240. The first APP switch 238 can be coupled to the second APP switch 240. The first APP switch 238 can be coupled to an application server 242 and to an OSS/BSS gateway 244. The application server 242 provides applications to the set-top box devices 216 and 224 via the private access network 266. Such applications enable the set-top box devices 216 and 224 to provide functions such as display, messaging, processing of IPTV data and VOD material, gaming functions, other functions, or any combination thereof. In a particular embodiment, the OSS/BSS gateway 244 includes operation systems and support (OSS) data, as well as billing systems and support (BSS) data.

The second APP switch 240 is coupled to a domain controller 246 that is adapted to provide web access, for example, to subscribers via the public network 212. The second APP switch 240 can be coupled to a subscriber and system store 248 that includes account information, such as account information that is associated with users who access the system 200 via the private network 210 or the public network 212. In a particular embodiment, the application tier 204 can also include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto.

In a particular embodiment, the set-top box devices 216 and 224 can access the system via the private access network 266 using information received from the client gateway 250. The private access network 266 provides security for the private network 210. User devices can access the client gateway 250 via the private access network 266, and the client gateway 250 can allow such devices to access the private network 210 once the devices are authenticated or verified. Similarly, the client gateway 250 can prevent unauthorized devices, such as hacker computers or stolen set-top box devices, from accessing the private network 210 by denying access to these devices beyond the private access network 266.

For example, when the set-top box device 216 accesses the system 200 via the private access network 266, the client gateway 250 can verify subscriber information by communicating with the subscriber and system store 248 via the private network 210, the first APP switch 238 and the second APP switch 240. Further, the client gateway 250 can verify billing information and status by communicating with the OSS/BSS gateway 244 via the private network 210 and the first APP switch 238. The OSS/BSS gateway 244 can transmit a query across the first APP switch 238, to the second APP switch 240, and the second APP switch 240 can communicate the query across the public network 212 to the OSS/BSS server 264. After the client gateway 250 confirms subscriber and/or billing information, the client gateway 250 can allow the set-top box device 216 access to IPTV content and VOD content. If the client gateway 250 cannot verify subscriber information for the set-top box device 216, (e.g., it is connected to a different twisted pair), the client gateway 250 can deny transmissions to and from the set-top box device 216 beyond the private access network 266.

The acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives television content, for example, from a broadcast service 256. Further, the AQT switch can be coupled to a video-on-demand importer server 258 that stores television content received at the acquisition tier 206 and communicates the stored content to the client-facing tier 202 via the private network 210.

The operations and management tier 208 can include an operations and management tier (OMT) switch 260 that conducts communication between the operations and management tier 208 and the public network 212. In the illustrated embodiment, the OMT switch 260 is coupled to a TV2 server 262 that is adapted to provide a TV2 user interface to user computers 268 via the public network 212, for example. Additionally, the OMT switch 260 can be coupled to an OSS/BSS server 264 and to a simple network management protocol (SNMP) monitor 265 that monitors network devices. In a particular embodiment, the OMT switch 260 can communicate with the AQT switch 252 via the public network 212.

In an illustrative embodiment, the set-top box device 216 is adapted to receive video content from the video server 280 and to send the video content to the television monitor 218. Further, the set-top box device 216 is adapted to receive a tag that is to be associated with the video content. For example, the set-top box device 216 can be adapted to receive the tag from a user interacting with the set-top box device 216 via the remote control device 220. In another example, the user can input the tag at the user phone 290, and the user phone 290 can be adapted to send the tag to the set-top box device 216 via the application tier 204 and the client-facing tier 202. In yet another example, the user phone 290 can be adapted to send the tag to the tag management system 233 via the application tier 204, and the tag management system 233 can be adapted to send the tag to the set-top box device 216.

The set-top box device 216 is adapted to send the received tag to the tag management system 233. In one example, the set-top box device 216 can periodically upload any tags received since a previous periodic upload, after an upload period expires. In another example, the set-top box device 216 can upload each tag after it is received. In a particular embodiment, the set-top box device 216 can register the tag with the set-top box device 216, such as by storing data identifying the tag at the set-top box device 216, before sending the tag to the tag management system 233.

The tag management system 233 is adapted to receive the tag from the set-top box device 216. The tag management system 233 can also receive an indication from the set-top box device 216 of video content with which the tag is to be associated. Further, the tag management system 233 can receive data from the set-top box device 216 indicating whether the tag is to be stored as a public tag; is to be stored in association with the set-top box 224; is to be stored in association with a social network; as otherwise specified; or any combination thereof. The tag management system 233 is adapted to store the tag in association with the set-top box device 216 and the video content, as otherwise specified by data received from the set-top box device 216, or a combination thereof.

In another embodiment, the tag management system 233 can be adapted to receive the tag from the user phone 290 and to identify video content received at the set-top box device 216 at or before a time that the tag was received at the tag management system 233. For instance, the tag management system 233 can identify the user phone 290 and the set-top box device 216 based on information obtained from the subscriber and system store 248, the OSS/BSS server 264, another element of the system 200, or any combination thereof. The tag management system 233 can identify video content received at the set-top box device 216 based on information received from a D-server 232, a video server 280, another element of the system 200, or any combination thereof. The tag management system 233 can be adapted to store the tag in association with the set-top box device 216 and the video content.

In addition, the set-top box device 216 is adapted to receive a request to view tagged video content. In one embodiment, the set-top box device 216 can provide a graphical user interface (GUI) at the television monitor 218 in response to the request, where the GUI includes a list of tags registered at the set-top box device 216. The set-top box device 216 can be adapted to receive a selection of a particular tag via the GUI. In another embodiment, the set-top box device 216 can be adapted to request tags accessible to the set-top box device 216 from the tag management system 233. The set-top box device 216 can be adapted to receive options related to the accessible tags from the tag management system 233 and to provide a GUI at the television monitor 218, that includes a list of tags accessible to the set-top box device 216. The set-top box device 216 can be adapted to receive a selection of a particular tag via the GUI.

The particular tag can be a tag submitted by the user or a tag made accessible to the set-top box device 216 by another user, including as a tag created by a user associated with another set-top box device at a different location, such as public tags, user-generated tags, tags accessible to a social network that includes the user, other tags, or any combination thereof. In a particular embodiment, the set-top box device 216 can be adapted to send data indicating the particular tag to the tag management system 233.

The tag management system 233 is adapted to receive a request for content associated with the particular tag from the set-top box device 216 and to send options of video content associated with the particular tag to the set-top box device 216. The set-top box device 216 can be adapted to receive the options of video content associated with the particular tag and to provide a GUI that includes the video content options at the television monitor 218. The set-top box device 216 is adapted to receive a selection of video content via the GUI and to send a request for the selected video content to the tag management system 233. In one embodiment, the tag management system 233 can be adapted to receive the request for the selected video content from the set-top box device 216 and to instruct a video server 280 to send the selected video content to the set-top box device 216. In another embodiment, the set-top box device 216 can be adapted to send the request for the selected video content to the video server 280.

In one embodiment, the set-top box device 216 can determine whether it is authorized to receive the requested video content. For example, if the video content is pay-per-view video content or requires digital rights management (DRM) authorization, the set-top box device 216 can be adapted to procure authorization, such as by prompting the user to purchase the video content. The set-top box device 216 is adapted to receive the requested video content and to send the video content to the television monitor 218.

Figure 3:
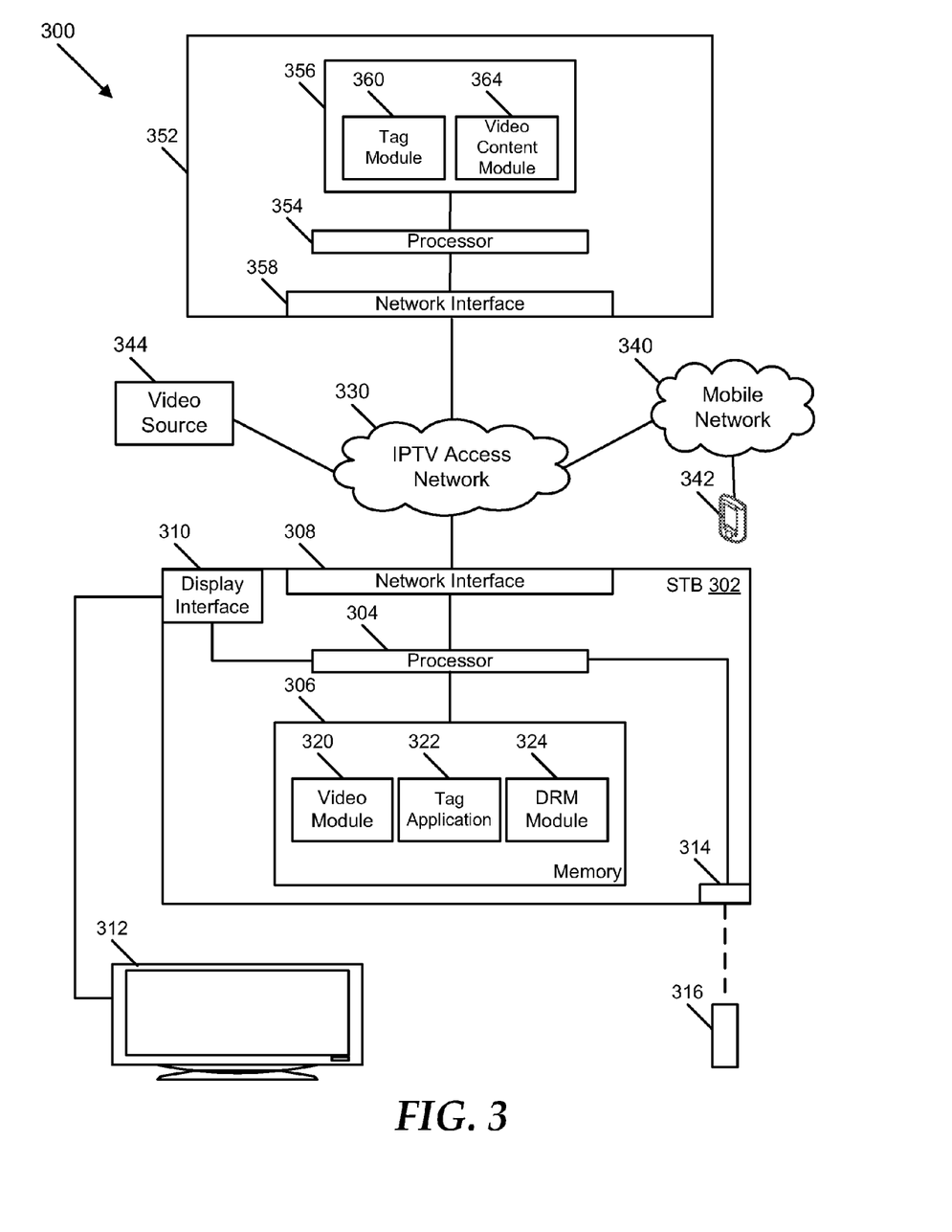
FIG. 3 is a block diagram illustrating a further embodiment of a system to tag video content.

FIG. 3 illustrates a further embodiment of a system 300 to tag video content. The system 300 includes a set-top box device 302 communicating with an IPTV access network 330. A tag management system 350 also communicates with the IPTV access network 330. In addition, a user device, such as a user phone 342, communicates with the IPTV access network 330 via a mobile network 340. Further, a video source 344 communicates with the IPTV access network 330.

The set-top box device 302 includes processing logic, such as a processor 304, and memory 306 accessible to the processor 304. The set-top box device 302 can also include a network interface 308 that is adapted to facilitate communication between the set-top box device 302 and the IPTV access network 330. In a particular embodiment, the memory 306 includes a plurality of modules 320-324. The modules 320-324 can include computer instructions that are readable and executable by the processor 304 to implement various functions of the set-top box device 302 with respect to tagging video content. For example, the modules 320-324 can represent various aspects of one or more software applications, operating systems, or other computer programs. In other embodiments, the modules 320-324 can be implemented as hardware logic or a combination of hardware logic and computer instructions.

In a particular embodiment, the memory 306 includes a video module 320 that is executable by the processor 304 to process tagged video content, untagged video content, or a combination thereof, that is received from the video source 344. For example, the video module 320 can be executable by the processor 304 to send the video content to the television 312 via the display interface 310. In another example, the video module 320 can be executable by the processor 304 to decode the video content, buffer the video content, otherwise process the video content, or any combination thereof, prior to sending the video content to the television 312.

Further, the memory 306 can include a tag application 322 that is executable by the processor 304 to process a tag that is to be associated with video content. The tag can be received, for example, from a remote control device 316 communicating with the set-top box device via a remote interface 314. The tag application 322 can be executable by the processor 304 to send the received tag to the tag management system 352. In one example, the tag application 322 can be executable by the processor 304 to periodically upload any tags received since a previous periodic upload, after an upload period expires. In another example, the tag application 322 can be executable by the processor 304 to upload each tag after it is received. In a particular embodiment, the tag application 322 can be executable by the processor 304 to register the tag with the set-top box device 302, such as by storing data identifying the tag at the set-top box device 302, before sending the tag to the tag management system 352.

In addition, the tag application 322 can be executable by the processor 304 to provide a GUI at the television monitor 312 in response to receiving a request for tagged content, where the GUI includes a list of tags registered at the set-top box device 302. The tag application 322 can be executable by the processor 304 to receive a selection of a particular tag via the GUI. In another embodiment, the tag application 322 can be executable by the processor 304 to request tags accessible to the set-top box device 302 from the tag management system 352 in response to receiving a request for tagged content. The tag application 322 can be executable by the processor 304 to receive options related to the accessible tags from the tag management system 352 and to provide a GUI at the television monitor 352 that includes a list of tags accessible to the set-top box device 302. The tag module 322 can be executable by the processor 304 to receive a selection of a particular tag via the GUI.

In a particular embodiment, the tag application 322 can be executable by the processor 304 to send data indicating the particular tag to the tag management system 352. The tag application 322 can be executable by the processor 304 to receive the options of video content associated with the particular tag and to provide a GUI at the television monitor 312 that includes the video content options. The tag application 322 can be executable by the processor 304 to receive a selection of video content via the GUI and to send a request for the selected video content to the tag management system 352. In another embodiment, the tag application 322 can be executable by the processor 304 to send the request for the selected video content to the video source 344.

In one embodiment, the memory 306 can include a DRM module 324 that is executable by the processor 304 to determine whether the set-top box device 302 is authorized to receive requested video content. For example, if the video content associated with a particular tag is pay-per-view video content or requires digital rights management (DRM) authorization, the DRM module 324 can be executable by the processor 304 to procure authorization, such as by prompting the user to purchase the video content.

The tag management system 352 includes processing logic, such as a processor 354, and memory 356 accessible to the processor 354. The tag management system 352 can also include a network interface 358 that is adapted to facilitate communication between the tag management system 352 and the IPTV access network 330. In a particular embodiment, the memory 356 includes a plurality of modules 360-362. The modules 360-362 can include computer instructions that are readable and executable by the processor 354 to implement various functions of the tag management system 352 with respect to tagging video content. For example, the modules 360-362 can represent various aspects of one or more software applications, operating systems, or other computer programs. In other embodiments, the modules 360-362 can be implemented as hardware logic or a combination of hardware logic and computer instructions.

For example, the memory 356 can include a tag module 360 that is executable by the processor 354 to store a tag received from the set-top box device 302. The tag module 360 can also be executable by the processor 354 to receive data from the set-top box device 302 indicating video content with which the tag is to be associated. Further, the tag module 360 can be executable by the processor 354 to receive data from the set-top box device 302 indicating whether the tag is to be stored as a public tag; in association with a set-top box of another user; in association with a social network; as otherwise specified; or any combination thereof. The tag module 360 can be executable by the processor 354 to store the tag in association with the set-top box device 302 and the video content, and as otherwise specified by data received from the set-top box device 302.

In another embodiment, the tag module 360 can be executable by the processor 354 to receive a tag from a user device, such as the user phone 342, and to store the tag, send the tag to the set-top box device 302, or a combination thereof. The tag module 360 can be executable by the processor 354 to identify video content received at the set-top box device 302 at or before a time that the tag was received at the tag management system 352, for instance, by communicating with the video source 344. The tag module 360 can be executable by the processor 354 to store the tag in association with the set-top box device 302 and the video content.

In an illustrative embodiment, the tag module 360 can be executable by the processor 354 to send to the set-top box device 302 a list of tags accessible to the set-top box device 302, in response to a request for accessible tags received from the set-top box device 302.

The memory 356 includes a video content module 362 that is executable by the processor 354 to receive a request for video content associated with a particular tag from the set-top box device 302 and to send options of video content associated with the particular tag to the set-top box device 302. In one embodiment, the video content module 362 is executable by the processor 354 to receive the request for the selected video content from the set-top box device 302 and to instruct the video source 344 to send the selected video content to the set-top box device.

Figure 4:
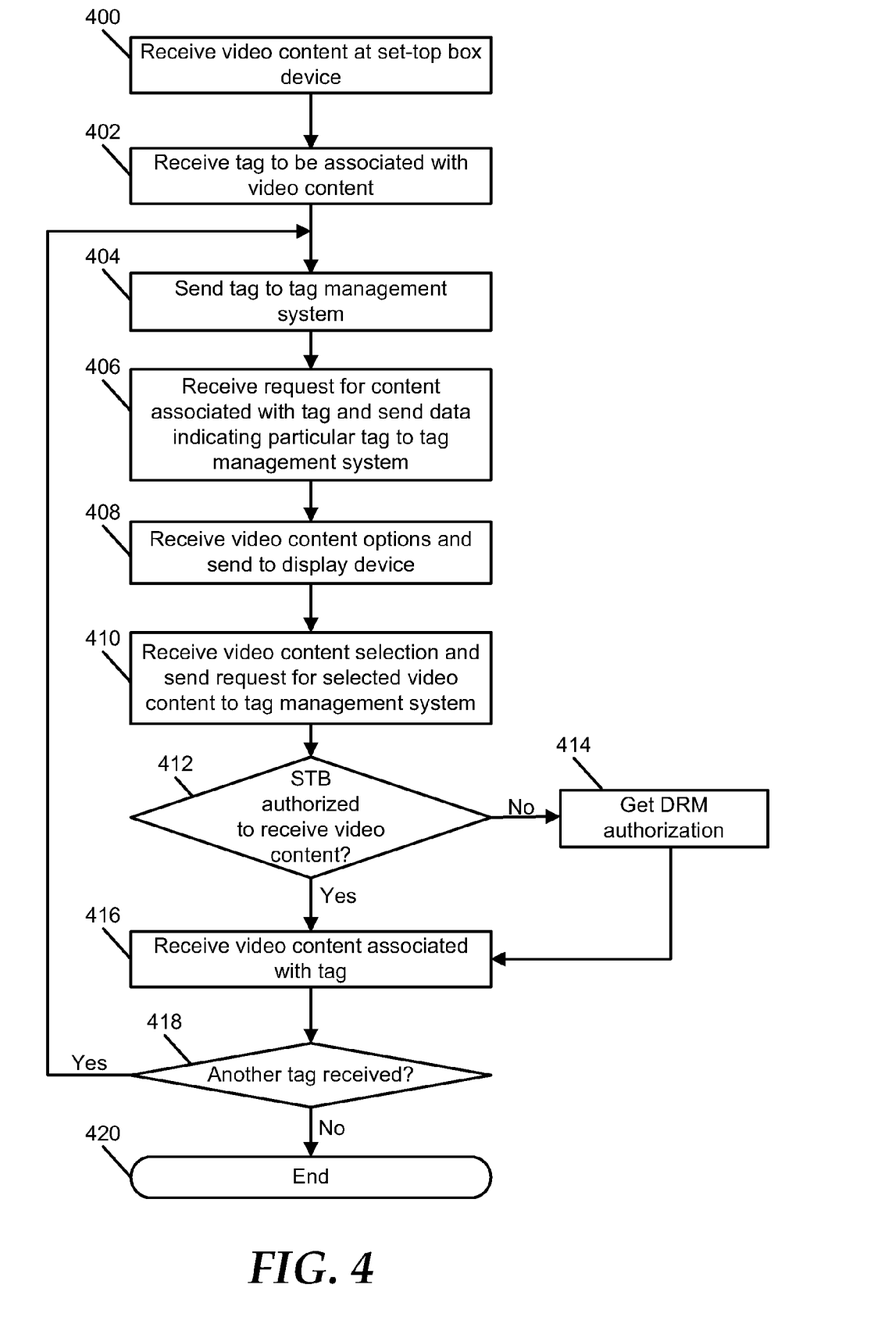
FIG. 4 is a flow diagram illustrating a particular embodiment of a method of tagging video content.

FIG. 4 illustrates a particular embodiment of a method of tagging video content. At block 400, a set-top box device receives video content. The set-top box device can send the video content to a display device coupled to the set-top box device. Moving to block 402, the set-top box device receives a tag that is to be associated with the video content. The set-top box device can receive the tag from a user interacting with the set-top box device, such as via a remote control device. Alternatively, the set-top box device can receive the tag from a user device via an IPTV access network or other network.

Proceeding to block 404, the set-top box device uploads the tag to a tag management system. In one example, the set-top box device can periodically upload any tags received since a previous periodic upload. In another example, the set-top box device can upload each tag after it receives the tag. The set-top box device can register the tag with the set-top box device (such as by storing data identifying the tag at the set-top box device). Continuing to block 406, the set-top box device receives a request for content associated with a particular tag and sends data indicating the particular tag to the tag management system. The particular tag can be the tag received at block 402, or another tag.

Advancing to block 408, the set-top box device receives options of video content associated with the particular tag and sends a graphical user interface that includes the video content options to the display device. At block 410, the set-top box device receives a selection of video content and sends a request for the requested video content to the tag management system. In another embodiment, the set-top box device can send the request to a video server, distribution server, or other server adapted to cause the requested video content to be sent to the set-top box device. Moving to decision node 412, the set-top box device can determine whether it is authorized to receive the requested video content. If the set-top box device is not authorized, it can procure authorization, such as digital rights management authorization, at block 414. Proceeding to block 416, the set-top box device receives the requested video content and sends the video content to the display device. Continuing to decision node 418, the set-top box device can determine whether it has received another tag associated with the requested video content. If so, the method can return to block 404. Otherwise, the method terminates at 420.

Figure 5:
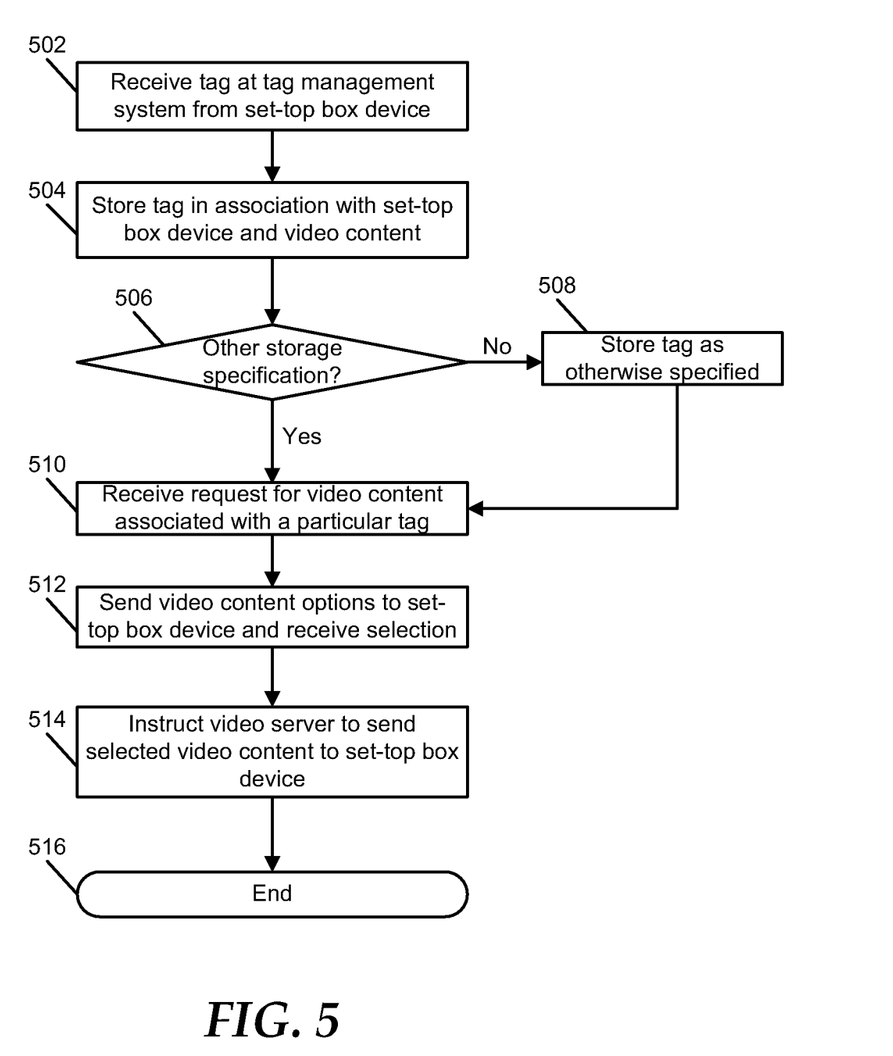
FIG. 5 is a flow diagram illustrating another particular embodiment of a method of tagging video content.

FIG. 5 illustrates another particular embodiment of a method of tagging video content. At block 502, a tag management system receives a tag from a set-top box device. The tag management system can also receive an indication of video content with which the tag is to be associated. Further, the tag management system can receive data indicating whether the tag is to be stored as a public tag; in association with a set-top box of another user; in association with a social network; as otherwise specified; or any combination thereof. Proceeding to block 504, the tag management system stores the tag in association with the set-top box device and the video content.

Continuing to decision node 506, the tag management system determines whether the tag is to be stored as a public tag, is to be stored in association with other set-top box devices (such as other users associated with a social network or buddy list), or a combination thereof, as specified by data received from the user device. If so, the method advances to block 508, and the tag management system stores the tag as specified by the data received from the user device.

At block 510, the tag management system receives a request for video content associated with a particular tag. The tag can be the tag received from the user device, a public tag, or a tag received from another source and associated with the set-top box device, a social network that includes the user, another group that includes the user or the set-top box device, or any combination thereof. Moving to block 512, the tag management system sends options of video content associated with the particular tag to the set-top box device and receives a selection of video content from the set-top box device. Proceeding to block 514, in a particular embodiment, the tag management system can instruct a video server other source of video content to send the selected video content to the set-top box device. The method terminates at 516.

Figure 6:
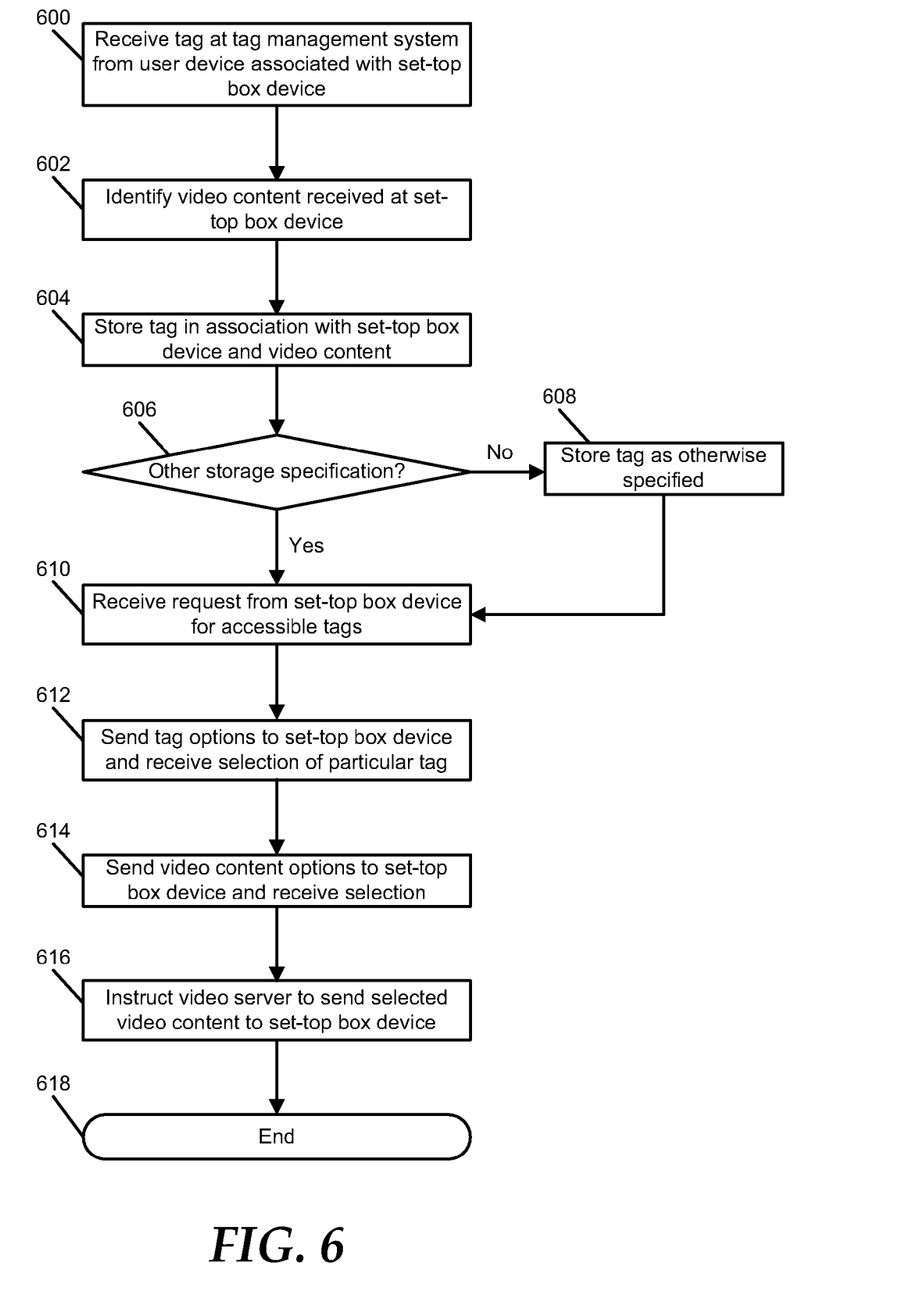
FIG. 6 is a flow diagram illustrating a further embodiment of a method of tagging video content.

FIG. 6 illustrates another particular embodiment of a method of tagging video content. At block 600, a tag management system receives a tag from a user device associated with a set-top box device. For instance, the tag management system can receive the tag from a mobile phone associated with a set-top box device. Moving to block 602, the tag management system identifies video content received at the set-top box device at or before a time that the tag was received. Proceeding to block 604, the tag management system stores the tag in association with the set-top box device and the video content.

Continuing to decision node 606, the tag management system determines whether the tag is to be stored as a public tag, is to be stored in association with other set-top box devices (such as other users associated with a social network or buddy list), or a combination thereof, as specified by data received from the user device. If so, the method advances to block 608, and the tag management system stores the tag as otherwise specified by the data received from the user device.

At block 610, the tag management system receives a request for tags accessible to the set-top box device, such as tags associated with the set-top box device, public tags, tags associated with a social network, other tags accessible to the set-top box device, or any combination thereof. Moving to block 612, the tag management system sends tag options to the set-top box device and receives a selection of a particular tag from the set-top box device. Proceeding to block 614, the tag management system sends options of video content associated with the particular tag to the set-top box device and receives a selection of video content from the set-top box device. Continuing to block 616, in a particular embodiment, the tag management system can instruct a video server other source of video content to send the selected video content to the set-top box device. The method terminates at 618.

In some embodiments, the methods disclosed herein can be performed as described. In other embodiments, various aspects of the described methods can be performed in alternate sequences or simultaneously.

Figure 7:
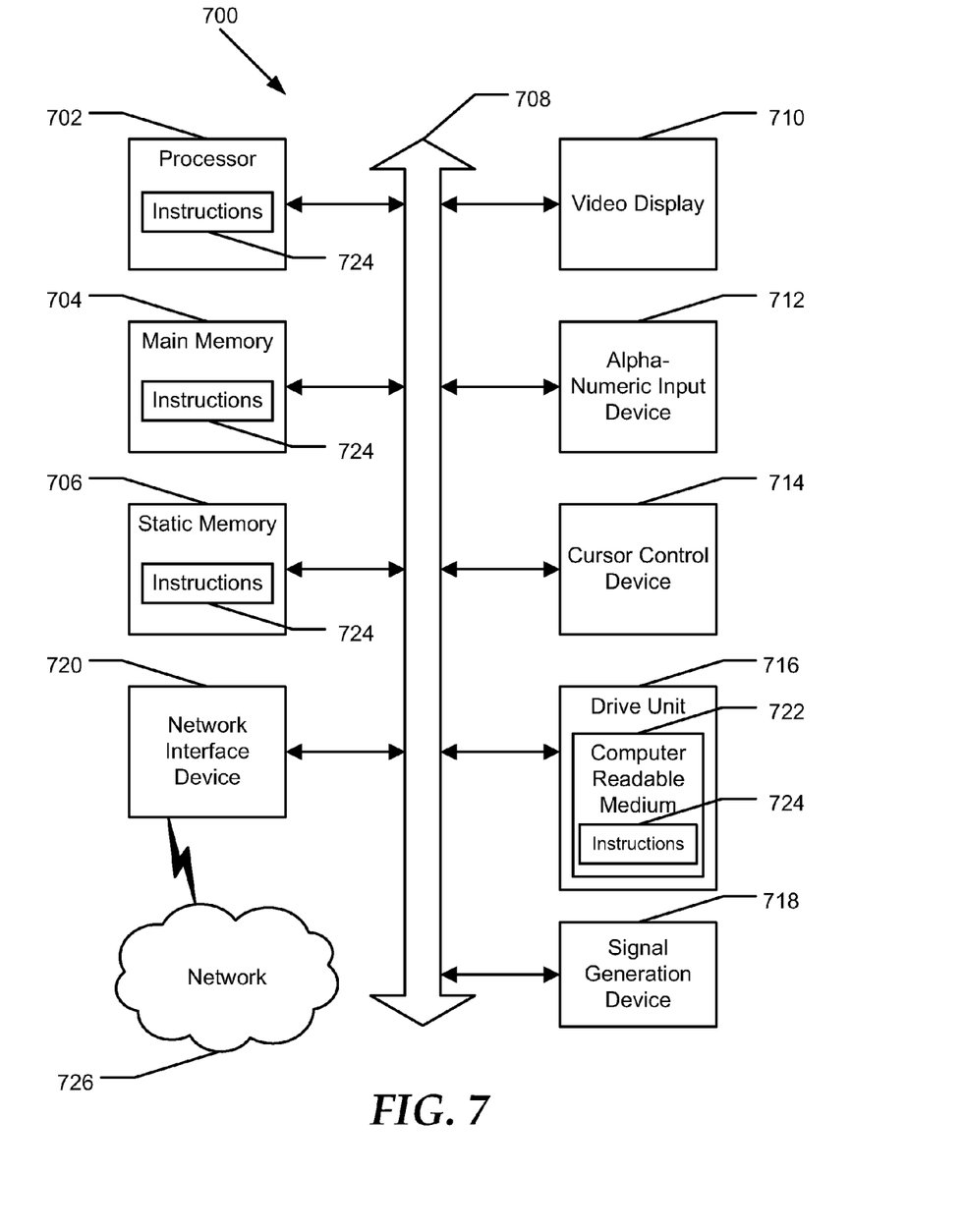
FIG. 7 is a diagram illustrating a particular embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices, such as a set-top box device, tag management server, user device, other device, or any combination thereof, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGs. are to be regarded as illustrative rather than restrictive.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A machine-readable storage medium comprising machine-readable instructions which, when executed by a processor of a set-top box device, cause the processor to perform operations comprising:

receiving video content at the set-top box device via a private video distribution access network;

receiving a tag associated with the video content at the set-top box device from a mobile phone interacting with the set top box device;

sending the tag and data to a tag management system via the private video distribution access network, wherein the data indicates that the tag is to be associated with the set-top box device and the video content at the set-top box device, and wherein the data indicates that the tag is to be stored in association with a social network;

sending a request for a plurality of options of video content associated with the tag to the tag management system; and receiving at the set-top box device the plurality of options of video content associated with the tag.

2. The machine-readable storage medium of claim 1, wherein the tag identifies a caller identification of the mobile phone.

3. The machine-readable storage medium of claim 1, wherein the private video distribution access network is an internet protocol television access network, and wherein the tag is received at the set-top box device from the mobile phone via the internet protocol television access network.

4. The machine-readable storage medium of claim 3, wherein the operations further comprise registering the tag at the set-top box device before sending the tag to the tag management system.

5. The machine-readable storage medium of claim 4, wherein the operations further comprise, after sending the tag to the tag management system and before sending the request for the plurality of options of video content at the set-top box associated with the tag to the tag management system:

receiving a request for tagged video content at the set-top box device before sending the request;

sending a first graphical user interface to a display device coupled to the set-top box device, wherein the first graphical user interface includes a list of selectable tags;

receiving a selection of one of the selectable tags via the first graphical user interface;

sending a second graphical user interface to the display device, wherein the second graphical user interface includes the plurality of options of video content at the set-top box associated with the tag; and receiving a selection of video content of the plurality of options of video content via the second graphical user interface.

6. The machine-readable storage medium of claim 1, wherein the tag comprises indicia of a non-hierarchical categorization of the video content.

7. A method comprising:

sending, by a set-top box device comprising a processor, a request for a plurality of video content options associated with a tag to a tag management system via a private video distribution access network; and receiving, by the set-top box device, the plurality of video content options associated with the tag at the set-top box device, wherein the tag is to be stored in association with a social network and wherein the tag identifies a caller identification of a mobile phone.

8. The method of claim 7, further comprising periodically uploading, by the set-top box device, tags to the tag management system, the tags received by the processor from the mobile phone.

9. The method of claim 7, further comprising determining, by the set-top box device, that the set-top box device is not authorized to receive the plurality of video content options and obtaining authorization before receiving the plurality of video content options.

10. The method of claim 7, registering, by the set-top box device, the tag at the set-top box device before sending the tag to the tag management system.

11. The method of claim 7, further comprising, after sending the tag to the tag management system and before sending the request for the plurality of options of video content at the set-top box device associated with the tag to the tag management system:

receiving, by the set-top box device, a request for tagged video content at the set-top box;

sending, by the set-top box device, a first graphical user interface to a display device coupled to the set-top box device, wherein the first graphical user interface includes a list of selectable tags;

receiving, by the set-top box device, a selection of one of the selectable tags via the first graphical user interface;

sending, by the set-top box device, a second graphical user interface to the display device, wherein the second graphical user interface includes the plurality of options of video content at the set-top box associated with the tag; and receiving by the set-top box device, a selection of video content of the plurality of options of video content via the second graphical user interface.

12. The method of claim 7, further comprising receiving, by the set-top box device, the tag via a remote control communicating with the set-top box device.

13. The method of claim 7, wherein the tag comprises indicia of a non-hierarchical categorization of the video content.

14. A system comprising:

a memory to store instructions; and a processor coupled to the memory, wherein the processor, responsive to executing the instructions, facilitates performance of operations comprising:

sending a request for a plurality of video content options associated with a tag to a tag management system via a private video distribution access network; and receiving the plurality of video content options associated with the tag at a set-top box device, wherein the tag is to be stored in association with a social network and wherein the tag identifies a caller identification of a mobile phone.

15. The system of claim 14, further comprising periodically uploading tags to the tag management system, wherein the tags are received from the mobile phone.

16. The system of claim 14, further comprising determining that the set-top box device is not authorized to receive the plurality of video content options and obtaining authorization before receiving the plurality of video content options.

17. The system of claim 14, further comprising registering the tag at the set-top box device before sending the tag to the tag management system.

18. The system of claim 14, further comprising, after sending the tag to the tag management system and before sending the request for the plurality of options of video content at the set-top box associated with the tag to the tag management system:

receiving a request for tagged video content at the set-top box device;

sending a first graphical user interface to a display device coupled to the set-top box device, wherein the first graphical user interface includes a list of selectable tags;

receiving a selection of one of the selectable tags via the first graphical user interface;

sending a second graphical user interface to the display device, wherein the second graphical user interface includes the plurality of options of video content at the set-top box associated with the tag; and receiving a selection of video content of the plurality of options of video content via the second graphical user interface.

19. The system of claim 14, further comprising receiving the tag via a remote control in communication with the set-top box device.

20. The system of claim 14, wherein the tag comprises indicia of a non-hierarchical categorization of the video content.

* * * * *